United States Patent [19]
Reyes et al.

[11] Patent Number: 6,081,587
[45] Date of Patent: *Jun. 27, 2000

[54] MODEM WITH RING DETECTION/MODEM PROCESSING CAPABILITY

[75] Inventors: Jason A. Reyes, Quincy; Frank B. Manning, Boston; Terence J. Manning, Milton; Eric L. McDonald, Revere; Michael T. Gilbride, Hanson, all of Mass.

[73] Assignee: Zoom Telephonics, Inc., Boston, Mass.

[*] Notice: This patent is subject to a terminal disclaimer.

[21] Appl. No.: 09/187,850

[22] Filed: Nov. 6, 1998

Related U.S. Application Data

[63] Continuation of application No. 08/639,350, Apr. 29, 1996, Pat. No. 5,835,578, which is a continuation of application No. 08/331,679, Oct. 31, 1994, abandoned, which is a continuation of application No. 07/797,540, Nov. 25, 1991, Pat. No. 5,361,296.

[51] Int. Cl.[7] .................................................. H04M 11/00
[52] U.S. Cl. ..................................... 379/93.34; 379/93.11; 379/373
[58] Field of Search ........................... 379/102.02, 93.09, 379/93.11, 93.28, 93.29, 93.31, 93.34, 100.01, 100.15, 100.16, 93.01, 373

[56] References Cited

U.S. PATENT DOCUMENTS

| | | | |
|---|---|---|---|
| 4,345,113 | 8/1982 | Shelley | 179/2 |
| 4,446,917 | 5/1984 | Shelley | 179/2 |
| 4,536,619 | 8/1985 | Hamatani et al. | 179/84 |
| 4,578,534 | 3/1986 | Shelley | 179/2 |
| 4,654,868 | 3/1987 | Shelley | 379/106 |
| 4,782,518 | 11/1988 | Mattley et al. | 379/373 |
| 4,847,892 | 7/1989 | Shelley | 379/92 |
| 4,939,775 | 7/1990 | Houck et al. | 379/373 |
| 4,998,273 | 3/1991 | Nichols | 379/373 |
| 5,040,209 | 8/1991 | Greenberg et al. | 379/373 |
| 5,065,427 | 11/1991 | Godbole | 379/98 |
| 5,153,897 | 10/1992 | Sumiyoshi et al. | 379/93 |
| 5,199,071 | 3/1993 | Abe et al. | 379/373 |
| 5,283,638 | 2/1994 | Engberg et al. | 379/93.01 |
| 5,333,152 | 7/1994 | Wilber | 379/102.02 |
| 5,361,296 | 11/1994 | Reyes et al. | 379/102.02 |

OTHER PUBLICATIONS

Bell South Services, Technical Reference "Description of the Network Interface to Ringmaster Service," Jun. 1989.
CCITT Joint Experts Meeting On Service Identification, Eatontown, New Jersey, Dec. 10–11, 1990, "Proposed Liaison to SG I," consisting of 4 pages.

*Primary Examiner*—Stella Woo
*Attorney, Agent, or Firm*—Hamilton, Brook, Smith & Reynolds, P.C.

[57] ABSTRACT

A modem which connects to a data terminal is connected to a telephone line capable of supporting multiple directory numbers with each number having a distinctive ring signal. The modem has a ring detector which indicates the presence of a ring signal associated with an incoming call from a remote device. The modem also includes a datapump unit capable of processing analog signals associated with a telephone line and digital data associated with the data terminal. A modem controller determines ring type from the ring signal of the incoming telephone call and alters the processing of the incoming telephone call based on the ring type. To that end, the controller may alter the processing of the incoming telephone call by configuring the datapump unit and/or configuring a controller compression/error-correction module based on the ring type before the incoming telephone call is answered. Further, the controller may direct the routing of the incoming telephone call via the data terminal based on the ring type.

18 Claims, 4 Drawing Sheets

MODEM WITH RING DETECTION/MODEM PROCESSING CAPABILITY

RELATED APPLICATIONS

This application is a Continuation of U.S. Ser. No. 08/639,350 filed Apr. 29, 1996, now U.S. Pat. No. 5,835,578, which is a File Wrapper Continuation of U.S. Ser. No. 08/331,679 filed Oct. 31, 1994, now abandoned, which is a Continuation of U.S. Ser. No. 07/797,540 filed Nov. 25, 1991, now U.S. Pat. No. 5,361,296, the entire teachings of which are incorporated herein by reference.

BACKGROUND

A modem is an interface device coupled to a data terminal and a telephone line. The data terminal may be a computer, a "dumb" terminal incapable of processing software or a facsimile machine. The modem permits the exchange of digital data with remote modem-supported data terminals over the telephone line by providing an interface function between each terminal and the telephone network. The modem is typically plugged into a telephone jack connected to a telephone line and is positioned inside or adjacent to the associated data terminal. To support transmission of digital computer data to a remote data terminal, the modem transforms the digital data from the local data terminal into analog form necessary for telephone line transmission. On the receiving end, a second modem transforms received analog signals into digital data which is provided to its local data terminal.

The four major sections of a typical modem are the telephone interface, data terminal interface, controller, and datapump. The telephone interface connects the telephone line to the modem and optionally to a local communications device such as a telephone or an answering machine. The telephone interface typically includes ring-detect circuitry which sends digital information to the controller and a data access arrangement for transmitting analog information between the telephone line and the modem's datapump. The data terminal interface links the modem to the local data terminal and is typically a serial interface for an external modem and a parallel interface for a modem that goes inside a computer.

The controller executes a program for directing the functions of the modem. The controller may compress data coming from the data terminal interface before sending it to the datapump and may decompress data coming from the datapump before sending it to the data terminal interface. Also, it is through commands to and responses from the controller that the data terminal has access to the configurational features of the modem. The datapump section is typically configured by the controller to process data between analog and digital signals in accordance with a data protocol.

The datapump may convert digital data from the data terminal interface to analog signals sent through the telephone line interface to the telephone line, or convert analog signals received from the telephone line via the telephone line interface to digital data transmitted through the data terminal interface or stored in the datapump or controller, or simultaneously do both types of conversion in a "full duplex" mode. A datapump may be, for example, capable of being configured to process data in accordance with a facsimile protocol or a data protocol. Note that although the term "modem" originates from modulator-demodulator, it is applied to characterize telephone line interface devices, such as a voice modem, in which modulation is not required. As such, the datapump may also be capable of being configured to process data in accordance with a voice protocol. The datapump's facsimile, data, and voice protocols may be set to varying speeds and modes.

When a remote modem is directed to communicate with a local modem connected to a data terminal, the remote modem dials the directory number of the local modem. The telephone network provides a ring signal to the local modem corresponding to an incoming telephone call. The local modem senses the ring signal and answers the incoming telephone call such that a data link is established between the two modems over the telephone line. Before the local modem's datapump is able to process data, the local datapump must be configured to the data protocol of the remote modem's datapump. To that end, the local modem typically engages in a negotiation or handshaking process with the remote modem to determine the appropriate data protocol and for configuring the local modem's datapump accordingly. For a modem to be configured as a data modem, data negotiation may also specify that the controller enter a compression and/or error-checking protocol, such as MNP5 or V.42bis. After the handshaking process has been completed, the local modem's datapump processes data according to the data protocol. However, the handshaking process is often time-consuming. For example, handshaking can often last 12 to 15 seconds for some high-speed modems.

Another problem is that while handshaking is standardized for two data-only modems communicating with each other or two fax-only modems communicating with each other, there is no standardized handshaking for modems capable of processing two or more communication modes including data, fax, and voice, such as fax and data, or fax and data and voice. This can further delay or even prevent establishment of the proper communication mode, and result in less reliable establishment of the proper mode. In addition, some approaches require additional hardware, such as touchtone decoders in the modem and touchtone generators in the calling equipment, and may require that a local or remote user interact with establishment of the proper communication mode.

SUMMARY OF THE INVENTION

Telephone companies offer a service in which multiple directory numbers are assigned to a single telephone line with each directory number being assigned a distinctive ring signal. In the present invention, a modem is connected to a telephone line having this multiple number service. As such, the ring type associated with the ring signal of an incoming telephone call to the modem identifies the directory number dialed by a remote device (i.e. a modem or a telephone). Remote devices are instructed to use different numbers to call the modem based on their data protocol. Thus, the ring type of the incoming telephone call identifies the data protocol of the remote device.

The modem includes a ring detector which indicates the presence of a ring signal associated with an incoming telephone call and a datapump unit capable of processing data associated with the incoming telephone call. In accordance with the present invention, a controller responsive to the ring detector determines the ring type of the incoming telephone call and alters the modem processing of the incoming telephone call based on the ring type. For example, the controller may alter the processing of the incoming telephone call by partially or completely configuring the datapump unit and/or configuring a controller compression/error-correction module based on the ring type. Since the ring type partially or completely specifies the protocol of the remote device, the datapump unit and/or the compression/error correction module are configured to the same protocol. As such, after the modem answers the incoming telephone call, the handshaking process employed before the datapump unit actually processes message data is minimized.

The controller may alter the processing of the incoming telephone call by directing the routing of the incoming call via a data terminal in a multi-user system based on the ring type. The data terminal connected to the modem may be a multi-task computer or may be coupled to a network. To that end, the controller provides the data terminal with a connect message indicating the ring type of the incoming call. The data terminal subsequently routes the incoming call to a user or a user group in the system or to a particular file in memory based on the connect message.

In one detailed embodiment of the present invention, the modem employs a datapump unit comprising a facsimile datapump and/or a data datapump and/or a voice datapump. The datapumps may be different hardware units, or they may be a single hardware unit such as a digital signal processor executing different sets of instructions for the three different modes. Based on the ring type of an incoming telephone call, the controller configures one of the datapumps to process data after minimal handshaking with the remote calling device.

To configure one of the datapumps, the controller determines the ring type and sets a group of user-controllable controller registers associated with the datapump based on the ring type. If the data datapump is to be configured, the controller sets a group of user-controllable AT Command Set compatible S-registers associated with the data datapump. As such, the appropriate controller registers are set as if they had been set by the data terminal user. After setting the appropriate user-controllable registers, the controller subsequently accesses these registers for configuring one of datapumps.

The configured datapump conveys signals between the telephone line interface and the data terminal interface or controller. If the data terminal is a computer employing facsimile/data modem software, the software is typically capable of responding properly to a message indicating whether a facsimile or data connection has been made by receiving from the modem a connect message such as "Connect Data" or "Connect Fax". In a preferred embodiment, the reconfiguration procedure performed by the modem is transparent to the computer software. Consequently, the present invention has the advantage of being compatible with existing computer software.

The modem of the present invention may also have the capability of passing an incoming telephone call to a modem output port coupled to a telephone jack which may be linked to a local device such as a telephone, a facsimile machine or an answering machine. To that end, the modem employs a relay located in the datapump unit which is selectively activated by the controller based on the ring type. When activated, the relay directs the incoming telephone call to the local device via the modem output port. Optionally, the relay may be selected to direct the incoming call after a predetermined number of rings for establishing a communication link with the remote device.

The modem may also have a reporting function for providing the computer with information associated with the ring signal of the incoming telephone call. In one embodiment, the controller determines the ring type of the ring signal and informs the computer of said ring type. In another embodiment, the controller further provides the computer with a binary ring signal converted by the ring detector at a selected sampling rate.

For a typical telephone network, the incoming telephone call is characterized by a ring signal having multiple ring periods comprised of ring bursts separated by intervals of silence. In the modem of the present invention, the controller is capable of distinguishing between a valid ring burst and a glitch. Further, the controller is capable of identifying a Type A ring signal of an incoming call prior to completion of its first ring period. The controller recongizes a single long ring burst or a single short ring burst followed by a long interval of silence as a Type A ring signal.

DETAILED DESCRIPTION OF PREFERRED EMBODIMENTS

Figure 1:
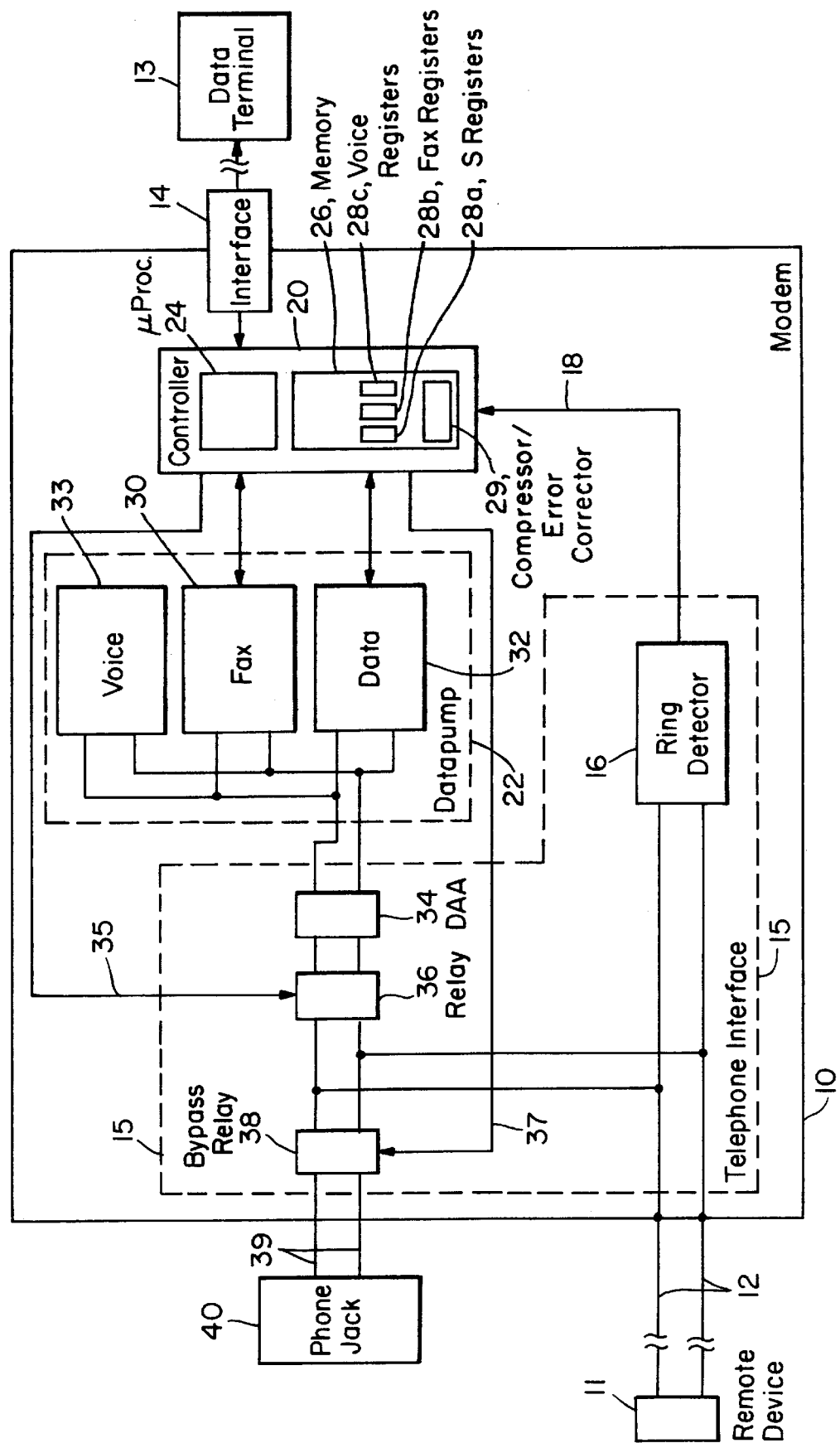
FIG. 1 is a block diagram of a modem embodying the principles of the present invention.

A block diagram of a modem incorporating the principles of the present invention is shown in FIG. 1. The modem 10 serves as an interface between a telephone line 12 and a computer 13 connected by a computer interface 14. Telephone companies offer a service option wherein a single phone line 12 is assigned multiple directory numbers with each number being assigned a distinctive ring signal. As such, telephone line 12 might have the following directory number assignment:

| Phone# | Ring Type | Ring Signal |
| --- | --- | --- |
| 542-1111 | Type A. | Normal Ring: 2 second ring, 4 second silence ("off"), repeat |
| 542-2222 | Type B. | Two medium rings: 800 msec on, 400 msec. off, 800 msec on, 4 seconds off, repeat |
| 542-2345 | Type C | Two short, one medium ring: 400 msec on, 200 msec off, 400 msec on, 200 msec off, 800 msec on, 4 seconds off, repeat |
| 542-0189 | Type D | Short, medium-long, short rings: 300 msec on, 200 msec off, 1 second on, 200 msec off, 300 msec on, 4 seconds off, repeat |

As such, the ring signal of an incoming telephone call from a remote device 11 to the modem 10 provides an indication of the directory number dialed by the calling device.

In accordance with the present invention, a ring detector 16 receives a ring signal associated with an in coming call and converts it to a binary ring signal. A controller 20 determines a ring type associated with the binary ring signal. Based on the ring type the controller configures a datapump unit 22 and optionally configures a data compressor/error-correction module 27 to process data associated with the incoming call in accordance with the data protocol of the remote calling device 11. The controller then directs the telephone line interface 15 unit to answer the incoming telephone call. After the controller conducts a minimal handshaking process which may include synchronization data or facsimile signals, the datapump 12 processes data flowing between the remote device 11 and the local data terminal 13.

The controller 20 is capable of directing the routing of the incoming call via the data terminal 13 in a muli-user system based on the ring type. The controller 20 may direct the routing of the incoming call without configuring the datapump unit 22 to process data or the datapump unit may be configured to process data accordingly. Preferably, the data terminal 13 is a multi-task computer coupled multiple user terminals (not shown) of a local area network (LAN). The controller 20 provides the data terminal 13 with a connect message indicating the ring type of an incoming call. The data terminal 13 employs LAN software which routes the incoming call to a user terminal or a group of user terminals or to a particular file in its memory based on the connect message.

When a remote device 11 is directed to send data to the computer 14, it calls the modem 10 using a telephone number corresponding to the communications mode of the remote device. The telephone network responds to the call by providing a ring signal to the modem 10 on the line 12. A telephone line interface 15 connects the telephone line 12 to the modem and includes the ring detection circuit 16 which detects the presence of the ring signal associated with the incoming telephone call. The ring signal received by the ring detection circuit 16 is typically a 90 Vrms nominal, 20 Hz signal provided by a telephone network. The ring detection circuit 16 converts the ring signal on line 12 to a binary form and provides the binary ring signal on line 18 to the controller 20.

The controller 20 includes a microprocessor 24 and memory 26. The microprocessor 24 runs a modem firmware program stored in the memory 26 to direct the functions of the modem 10. The firmware program is organized into modules which are each dedicated to one or more modem functions and are described below. The memory 26 also contains a table or list of configuration settings for different communication modes typically provided by the computer 13. The configuration settings are typically accessed by the controller firmware to provide datapump configurations and an optional controller compression/error-correction module configuration to support various communication modes. In the present invention, each ring type is mapped to a different communication mode, which includes a datapump setting and may also include a setting of the controller's optional compression mode. For example, the controller 20 may be provided with the following configuration settings:

| Ring Type | Configuration Setting |
|---|---|
| For Ring Type A | Modem Answer C, configure data datapump to speed X with compression/error correction enabled |
| For Ring Type B | Facsimile Answer, configure facsimile datapump |
| For Ring Type C | No answer, enable telephone switch |
| For Ring Type D | Modem Answer M, configure data datapump to speed X with compression/error correction disabled. |

For an incoming telephone call, the controller firmware employs a ring detect module which receives a binary ring signal from the detector circuit 16. The ring detect module determines the ring type by analyzing the binary ring signal as described in detail below.

Accessing the configuration settings stored in memory 26, the ring detect module sets an appropriate group of user-controllable registers 28a–c to the configuration associated with the ring type. In the preferred embodiment, the controller configures a group of AT Command Set compatible S-registers 28a if the modem is to be configured to answer in the data mode. Further, the controller configures facsimile registers 28b or voice registers 28c if the modem is to be configured to answer in the facsimile mode or voice mode, respectively. For any of the modem configurations, the appropriate user-controllable controller registers are set as if they had been set by the data terminal user.

Next, the controller firmware answer module reads the appropriate group of registers 28a–c to configure the datapump unit 22 and optionally configures compressor/error-corrector module 29 in the controller. In an alternative embodiment, the ring detect module determines the ring type and directly configures the appropriate datapump and other registers. In either embodiment, the modum is partially or completely configured to the data protocol of the remote calling device before the incoming call has been answered and without handshaking.

The datapump unit 22 includes digital signal processing circuitry and memory registers (not shown) for converting analog data to digital form for the computer 13 and for converting digital computer data to analog form for transmission to remote devices. In one system, the datapump unit comprises a facsimile datapump 30 for supporting facsimile communications and a data datapump 32 for supporting standard data communications. Further, the datapump unit 22 may also comprise a voice datapump 33 which converts analog signals to voice data for storage in the data terminal 13 and converts outgoing data from the terminal to voice signals. While the facsimile datapump 30, the data datapump 32 and the voice datapump 33 are shown as separate hardware units, they may be a single hardware unit such as a digital signal processor executing different instruction sets for the facsimile mode, the data mode and the voice mode.

The telephone line interface unit 15 employs a relay 36 and a data access arrangment 34 which are selectively enabled by the controller 20 for answering an incoming telephone call based on the ring type. Further, the telephone line interface unit 15 includes a bypass relay 38 which is selectively enabled by the controller 20 based on the ring type to pass an incoming call to a telephone jack 40 via telephone lines 39 with or without the modem answering.

Figure 2A:
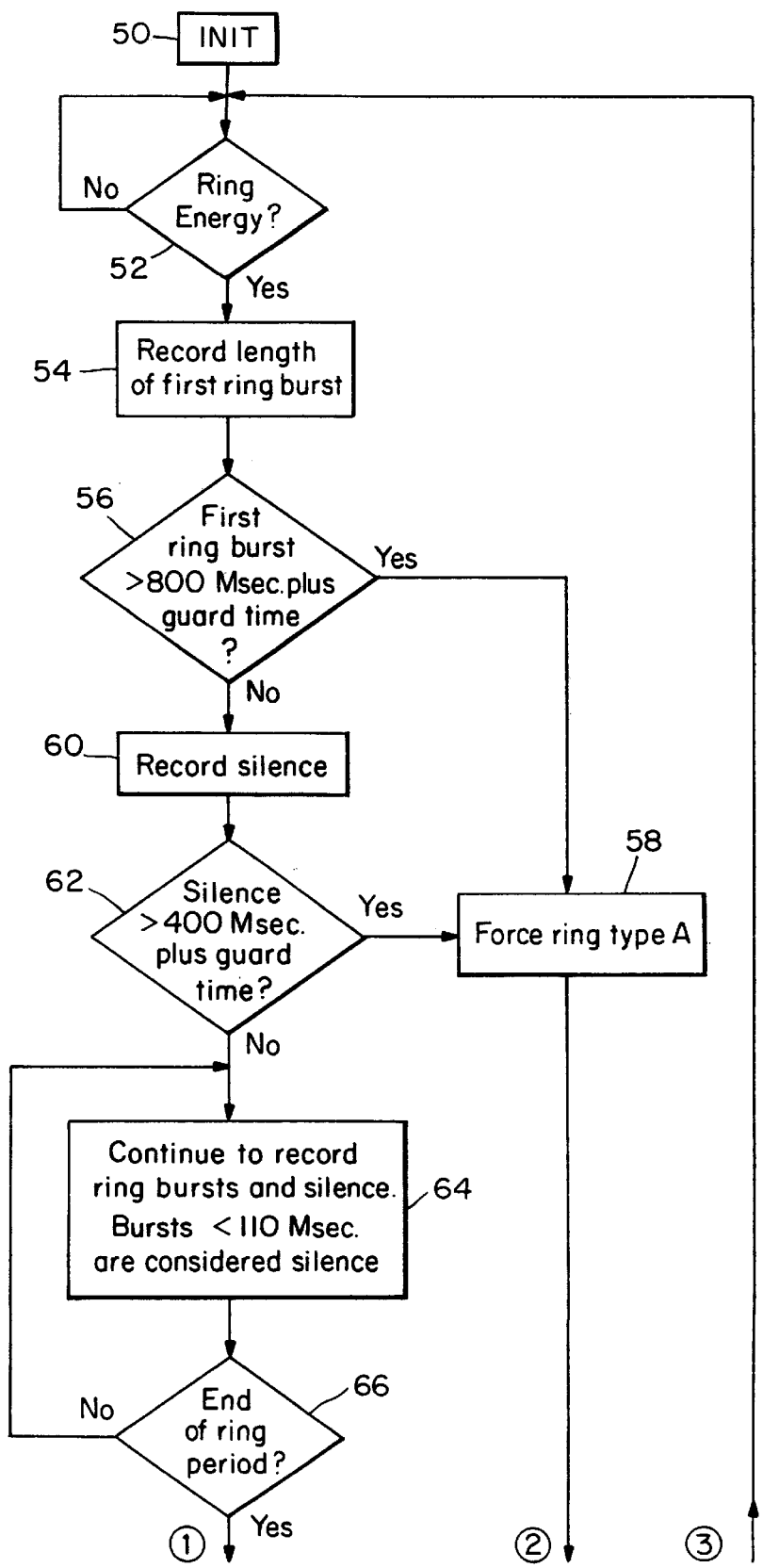
FIGS. 2A–2C are a flow chart of the processing sequence employed by the modem firmware for an incoming telephone call.
Figure 2B:
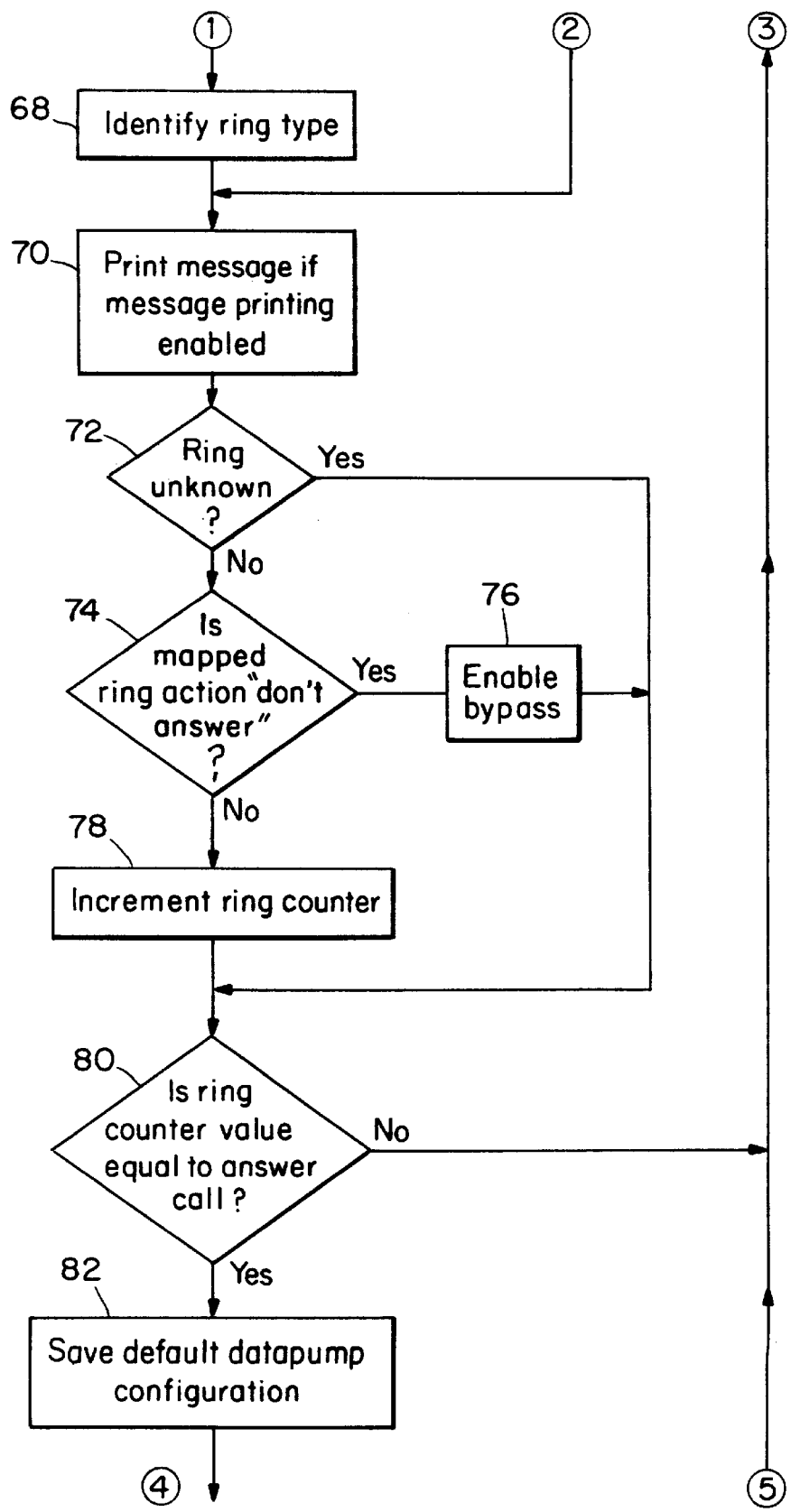
Figure 2C:
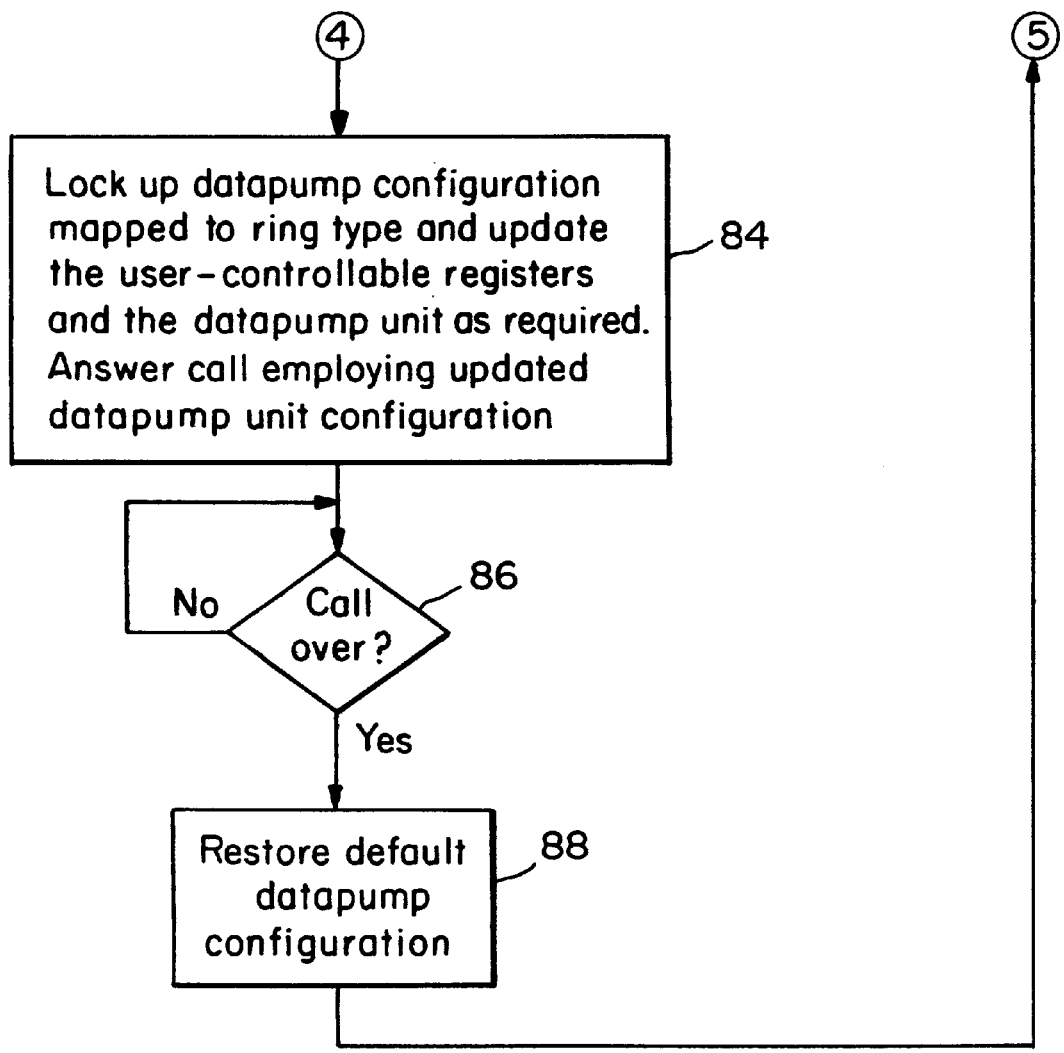

FIG. 2 is a flow chart illustrating the controller firmware processing procedure in accordance with the present invention. For illustration purposes, the controller firmware has stored in memory the aforementioned directory number assignment.

Note that each of the four ring signals has a nominal 6 second ring period. Further, the ring period for each ring signal includes a unique 2 second (nominal) ring burst pattern followed by 4 seconds of silence. For example, the ring signal of ring type A has a single 2 second ring burst and the ring signal of ring type B has two 800 msec ring bursts. Also, each ring is represented as a series of 20 Hz sine waves which are converted to a binary sequence by the ring detector.

The controller firmware is initialized when the modem is powered up (50). Once initialized, the firmware's ring detect module looks for ring signal energy from the ring detection circuit (52). More specifically, the ring detect module samples the ring detector output at a 10 msec rate. For each sampling, the ring detect module determines whether the detector output is a low or high voltage. Each low voltage indication is counted in a low counter and each high voltage indication is counted in a high counter. Further, for each high voltage counted, the low counter is reset. After 100 msec of sampling where only low voltage indications are counted, the ring detect module checks the high voltage count and resets the counter. If the high voltage counter indicates a number of high voltage indications corresponding to a 110 msec ring burst or longer, the ring detect module records the length of the ring burst (54). Alternatively, if the high counter indicates the ring burst is less than 110 msec, then the high voltage count is discarded as a glitch.

If the first ring burst is greater than 800 msec plus a guard time, the ring detect module determines that the ring signal has ring type A (56 and 58). Referring to the forementioned directory number assignment, only ring type A has a single long ring burst exceeding 800 msec.

Alternatively, for a shorter ring burst which is less than 800 msec, the ring detector records the length of the silence before the next ring burst (60). If the silence is greater than 400 msec plus guard time, the ring detector again determines that the ring signal has ring type A (62 and 58). Again referring to the directory number assignment, only ring type A has a long silence period between ring bursts which is greater than 400 msec.

If the silence is less than 400 msec plus guard time, the ring detect module continues to record subsequent ring bursts and silence periods to determine ring type A, B or C (64). Note that ring bursts of length less than 110 msec are insufficient bursts and considered silence. During this process, the ring detector module continuously verifies whether the ring burst detection period has expired (66). Since the maximum length ring burst is 2 seconds, the ring detection period is about 2.3 seconds to allow slight timing inaccuracies.

Once the 2.3 second ring period has ended, the ring detector module identifies the ring type in accordance with the directory number assignment stored in the controller memory (68). Next, the ring detector optionally provides a connection message to the computer (70). When the computer has software modules for data or fax or voice, in the preferred embodiment, the modem provides a connection message such as "Connect Data" or "Connect Fax" or "Connect Voice" so that the proper software module is used. Alternatively, this connection message may indicate to the computer the ring type of the incoming call. Further, the print message may include the binary ring signal from the ring detection circuit.

If the ring signal does not correspond to a known ring type (72), the ring detect module does not increment its ring counter. As such, the ring counter value does not correspond an answer call condition (80), so the ring detect module returns to step 52 to process the next ring period. Similarly, if the identified ring type is mapped to a do not answer ring action (74), the ring detect module enables the bypass switch (76) and does not increment the ring counter. Thus, the ring counter value does not correspond to an answer-the-call condition (80), so the ring detect module returns to step 52 to process the next ring period.

If neither of the two previous conditions occur, the ring counter is incremented (78) and the ring detector module determines whether the value corresponds to an answer the call condition (80). If the answer the call condition is satisfied, the ring detect module saves the default or existing datapump configuration data located in the user-controllable registers (82). Next, the ring detect module obtains the datapump configuration mapped to the determined ring type and updates a group of the user-controllable registers (84). The answer call module subsequently reads these registers and sets the datapump registers appropriately. As such, the datapump unit is configured based on the ring type to support the data protocol of the remote calling device.

The answer call module then activates the relay 36 of FIG. 1, enabling the datapump to answer the incoming telephone call through the transformer (34). After the call has been answered and minimal handshaking has been performed, the datapump receives incoming analog data from the remote device. The datapump converts the data to digital form, stores it in registers and interrupts the controller to notify it that digital data is available. The controller receives this digital data by reading the registers and subsequently provides it to the computer. During this process, the answer call module periodically polls the datapump to determine whether the telephone call is over (86). If it is determined that the call is over, the answer call module restores the controller configuration and returns the firmware to step 52.

EQUIVALENTS

Those skilled in the art will recognize or be able to ascertain, using no more than routine experimentation, many equivalents to the specific embodiments of the invention described herein. These and all other equivalents are intended to be encompassed by the following claims.

What is claimed is:

1. A computer system comprising:
   a computer; and
   a modem coupled to the computer to serve as an interface between the computer and a telephone line, the modem comprising:
   a ring detector; and
   a processor which identifies ring type based on detected ring signals and provides the computer with information associated with the ring signal of an incoming call.

2. A computer system as claimed in claim 1 wherein the processor provides ring type to the computer.

3. A computer system as claimed in claim 1 wherein the processor provides the type of an incoming call to the computer.

4. A computer system as claimed in claim 3 wherein types of incoming calls provided to the computer include facsimile and data.

5. A computer system as claimed in claim 4 wherein the types of incoming calls provided to the computer include voice.

6. A computer system as claimed in claim 1 wherein the processor further configures a modem data pump.

7. A computer system as claimed in claim 6 wherein the data pump is configurable to facsimile and data configurations.

8. A computer system as claimed in claim 7 wherein the data pump is configurable to a voice configuration.

9. A computer system as claimed in claim 1 wherein the computer includes software to route incoming calls.

10. A method of processing incoming telephone calls comprising:
    at a modem, detecting a ring signal of an incoming telephone call on a telephone line;

associating the ring signal with a ring type;

forwarding a message to a computer with information associated with the ring signal of the incoming call based on the ring type.

11. A method as claimed in claim 10 wherein the message includes ring type.

12. A method as claimed in claim 10 wherein the message includes type of incoming call.

13. A method as claimed in claim 12 wherein types of incoming call include facsimile and data.

14. A method as claimed in claim 13 wherein types of incoming call include voice.

15. A method as claimed in claim 10 further comprising configuring a modem data pump based on the ring type.

16. A method as claimed in claim 15 wherein the data pump is configurable to facsimile and data configurations based on ring type.

17. A method as claimed in claim 16 wherein the data pump is configurable to a voice configuration based on ring type.

18. A method as claimed in claim 10 further comprising, in the computer, processing the received information to route the incoming call.

* * * * *